March 19, 1963
F. W. ROHE
3,081,809
BARREL NUT
Original Filed Aug. 23, 1954
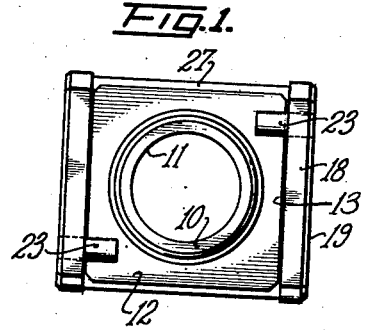
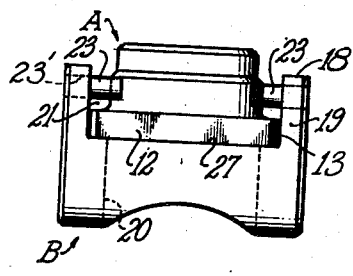
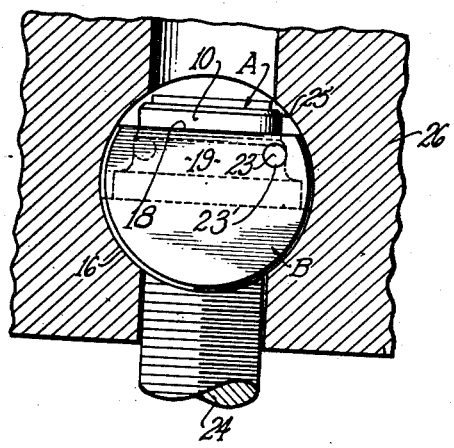
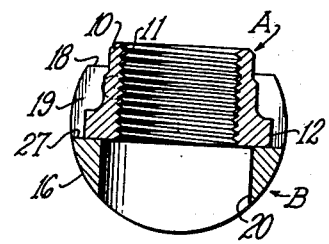
INVENTOR.
FREDERICK W. ROHE
BY
ATTORNEY United States Patent Office 3,081,809
Patented Mar. 19, 1963

3,081,809
BARREL NUT
Frederick W. Rohe, Placentia, Calif., assignor, by mesne assignments, to Shur-Lok Corporation, Anaheim, Calif., a corporation of California
Original application Aug. 23, 1954, Ser. No. 451,469. Divided and this application Sept. 6, 1960, Ser. No. 54,283
5 Claims. (Cl. 151—41.76)

This application is a division of my pending application S.N. 451,469, filed August 23, 1954, for Barrel Nut, now abandoned.

This invention relates generally to floating nuts and in particular to a nut of a type which I prefer to designate as a barrel nut. The general object of the invention is to provide a nut having means for mounting it in a floating condition such as to provide for self alignment with respect to the axis of a bolt that is threaded into the nut.

Specifically, the invention aims to provide a nut assembly which, when mounted, will provide for limited adjustments of the nut bodily in directions transversely of the bolt axis, and, in addition, will provide for rotatable adjustment of the nut about an axis at right angles to the bolt axis.

A further object is to provide a nut assembly including a nut and a nut retainer having means to restrain rotation of the nut relative thereto while accommodating limited bodily lateral shift of the nut relative to the retainer; the retainer being adapted for mounting in a socket for the rotatable movements mentioned above, and cooperating with the socket to hold the nut against rotation when a bolt is being threaded into the nut.

Other objects will become apparent in the ensuing specifications and appended drawing in which:

FIG. 1 is a plan of a nut and retainer assembly embodying the invention in one form;

FIG. 2 is a side view thereof;

FIG. 3 is an end view of a nut and retainer assembly embodying the invention and illustrating a possible arrangement with an anchoring body; and FIG. 4 is a sectional view of the nut and retainer.

Referring now to the drawings in detail, I have shown therein a barrel nut assembly comprising generally a nut A and a retainer B in which the nut A is mounted for limited bodily shifting movements transversely of the axis of a bolt threaded into the nut.

Nut A comprises a body 10, which may be of generally cylindrical form, an internal thread 11 defining a bolt receiving opening therein, and a flange 12 which projects radially from one end thereof. Flange 12 has parallel side flats 13 and square ends 14.

Retainer B is in the form of a major segment of a cylinder, with a lateral wall 16 constituting approximately a 240° segment of a cylindrical surface, a flat seat 27 which is arranged chordally with reference to wall 16, and two retainer lips 19 which have chordal end margins 18 and preferably have squared outer faces, constituting the end faces of the retainer.

A bore 20 extends through the center of retainer B, normal to the flat seat 27.

Retainer B is rectangular in plan and its retainer lips 19 have flat, parallel inner walls defining a rectangular recess 21 extending through to both sides of the retainer, the seat 27 defining the bottom of the recess. Flange 12 of nut A is correspondingly rectangular, having its flats 13 fitted with slight clearance between the end walls of recess 21. Retainer pins 23, anchored in bores 23' in respective retainer lips 19, are positioned at diagonally opposite corners of retainer B as viewed in plan (FIG. 1) and overlie flange 12 so as to restrain it from lifting away from its seat 27. Pins 23 are of a length such as to project beyond the side extremities of nut body 10 parallel to the longitudinal axis of retainer B. Thus, sliding movement of nut A in recess 21 transversely of said longitudinal axis, is limited in each direction by contact of nut body 10 against the respective pins 23, although a substantial range of such lateral shifting movement is permitted.

A bolt 24 is adapted to be threaded into nut A. Retainer B and nut A are adapted to be mounted in a cylindrical bore 25 in a body 26 to which the bolt 24 is to be attached with a blind, self-aligning connection.

In the operation of the nut assembly, nut A may have limited movements in recess 21, in the form of lateral shifting movements wherein flange 11 slides on shoulder 27, beneath pins 23. Such limited movements are adequate to provide amply for self adjustment of the nut to the position that the bolt may be constrained to assume, in any ordinary installation. At the same time, the retainer B is rotatable in bore 25 to align the nut axis with that of the bolt opening in body 26, or if such opening accommodates a spread of tilting movement of the bolt, the nut will rotate for self alignment with the bolt in any position to which it may tilt.

I claim:

1. In a barrel nut assembly, in combination: a socket having a cylindrical internal bearing wall defining a journal cavity and having a bolt hole communicating radially therewith; a one-piece nut retainer journalled in said cavity, said retainer comprising a central body portion having an outer wall of segmental-cylindrical form and of less than 180° arcuate extent and an opposed flat inner wall disposed in chordal relation to said outer wall and constituting a nut-seat, and a pair of retainer lips formed integrally with respective ends of said central body, projecting therefrom at right angles to said nut-seat, in axially spaced planes normal to the axis of said cavity, and having at their respective ends, segmental-cylindrical outer bearing wall surfaces crossing the diametral plane of said journal cavity parallel to said nut-seat, said retainer having a continuous segmental-cylindrical outer bearing wall of greater than 180° arcuate extent, composed of the one outer wall of said central body portion and of said outer wall surfaces of said retainer lips merging with said one outer wall, said continuous outer bearing wall being in full bearing engagement with said socket bearing wall on both sides of said diametral plane so as to provide load-bearing journal action in both directions along the axis of said bolt hole, said lips having non-circular inner walls diametrically opposed across the axis of said bolt hole and cooperating with said nut-seat to define a nut-retainer recess occupying the central area of said journal cavity; a nut including an internally threaded nut body and an end flange at one end thereof, said flange being loosely fitted within said retainer recess and having opposite non-circular sides at least portions of which are complementary to said non-circular inner walls and which are engaged between said lips with a rotation-resisting engagement, and with said one end of the nut seated on said nut-seat, said nut projecting out of said retainer recess and occupying the space within said journal cavity beyond said retainer; said nut retainer having a bore extending from said central body outer wall to said nut-seat and normal to the latter at the center thereof, said bore having a diameter greater than the thread diameter of said nut; and a plurality of retainer means anchored on said lips and projecting into said retainer recess in spaced parallel relation to said nut seat and in diametrically opposed relation to one another across said bolt hole axis, and overlying portions of said flange in closely confining relation thereto such as to retain said nut substantially in contact with said nut-seat each said retainer means projecting into said recess a distance greater than the distance from its supporting lip to that portion of the nut disposed in the plane of the several retainer means and between the axes thereof when said nut flange is in engagement with the opposite lip, and the planes containing the ends of opposite retainer means being spaced apart less than the width of said latter portion of the nut, whereby said retainer means are disposed in blocking relation to the opposite sides of said nut with reference to sliding movement of the nut on its seat parallel to said non-circular inner walls, whereby to retain the nut captive in said nut retainer.

2. A barrel nut assembly as defined in claim 1, wherein said inner walls of the retainer lips are flat and are disposed in parallel flat planes normal to the axis of said cavity, wherein said nut flange is substantially square, having diametrically opposed flats fitted to said inner walls of the lips within said recess to restrain rotation of the nut, and wherein said retainer means comprises a pair of studs anchored in bores in diagonally opposed extremities of said lips and projecting over diagonally opposed corners of said flange, parallel to said cavity axis, said nut body projecting radially of said cavity axis between said studs, and said studs projecting at right angles to said axially spaced planes of the retainer lips and into blocking relation to the opposite sides of said nut-body with reference to sliding movement of the nut on its seat parallel to said axially spaced planes, whereby to retain the nut captive in said nut retainer.

3. In a barrel nut assembly, in combination: a socket having a cylindrical internal bearing wall defining a journal cavity and having a bolt hole communicating radially therewith; a one-piece nut retainer journalled in said cavity, said retainer comprising a central body portion having an outer wall of segmental-cylindrical form and of less than 180° arcuate extent and an opposed flat inner wall disposed in chordal relation to said outer wall and constituting a nut-seat, and a pair of retainer lips formed integrally with respective extremities of said central body, projecting therefrom at right angles to said nut-seat, and having segmental-cylindrical lateral outer wall surfaces crossing the diametral plane of said journal cavity parallel to said nut-seat, said retainer having a continuous segmental-cylindrical outer bearing wall of greater than 180° arcuate extent, composed of the one outer wall of said central body portion and of said outer wall surfaces of said retainer lips merging with said one outer wall, said continuous outer bearing wall being in full bearing engagement with said socket bearing wall on both sides of said diametral plane so as to provide load-bearing journal action in both directions along the axis of said bolt-hole, said lips having non-circular inner walls diametrically opposed across the axis of said bolt-hole and cooperating with said nut-seat to define a nut retainer recess occupying the central region of said journal cavity; a nut including an internally threaded nut body and an end flange at one end thereof, said flange being loosely fitted within said retainer recess and having opposite non-circular sides at least portions of which are complementary to said non-circular inner walls and which are engaged between said lips with a rotation-resisting engagement, and with said one end of the nut seated on said nut-seat, said nut projecting out of said retainer recess and occupying the space within said journal cavity beyond said retainer, and a pair of retainer pins anchored in bores in said retainer lips, projecting into said retainer recess in spaced parallel relation to said nut-seat and overlying portions of said flange in closely confining relation thereto such as to retain said nut substantially in contact with said seat, each retainer pin projecting into said recess a distance greater than the distance from its supporting lip to that portion of the nut disposed in the plane of the several retainer pins and between the axes thereof when said nut flange is in engagement with the opposite lip, and the planes containing the ends of opposite retainer pins being spaced apart less than the width of said latter portion of the nut, whereby said retainer pins are disposed in blocking relation to the opposite sides of said nut with reference to sliding movement of the nut on its seat parallel to said non-circular inner walls whereby to retain the nut captive in said nut retainer said nut retainer having a bore extending from said central body outer wall to said nut-seat and normal to the latter at the center thereof, said bore having a diameter greater than the thread diameter of said nut.

4. In a barrel nut assembly, in combination: a socket having a cylindrical internal bearing wall defining a journal cavity and having a bolt-hole communicating radially therewith; a one-piece nut retainer journalled in said cavity, said retainer comprising a central body portion having an outer wall of segmental-cylindrical form and of less than 180° arcuate extent and an opposed flat inner wall disposed in chordal relation to said outer wall and constituting a nut-seat, and a pair of retainer lips formed integrally with respective ends of said central body, projecting therefrom at right angles to said nut-seat in axially spaced planes normal to the axis of said cavity, and having at their respective ends, segmental-cylindrical lateral outer wall surfaces crossing the diametral plane of said journal cavity parallel to said nut-seat, said retainer having a continuous segmental-cylindrical outer bearing wall of greater than 180° arcuate extent, composed of the one outer wall of said central body portion and of said outer wall surfaces of said retainer lips merging with said one outer wall, said continuous outer bearing wall being in full bearing engagement with said socket bearing wall on both sides of said diametral plane so as to provide load-bearing journal action in both directions along the axis of said bolt-hole, said lips having non-circular inner walls diametrically opposed across the axis of said bolt-hole and cooperating with said nut-seat to define a nut-retainer recess occupying the central area of said journal cavity; a nut including an internally threaded nut body and an end flange at one end thereof, said flange being loosely fitted within said retainer recess and having opposite non-circular sides at least portions of which are complementary to said non-circular inner walls and which are engaged between said lips with a rotation-resisting engagement, and with said one end of the nut seated on said nut-seat, said nut projecting out of said retainer recess and occupying the space within said journal cavity beyond said retainer; said nut retainer having a bore extending from said central body outer wall to said nut-seat and normal to the latter at the center thereof, said bore having a diameter greater than the thread diameter of said nut; and a pair of relatively short rigid retainer pins each having one end portion mounted in a bore in a respective lip and a projecting end portion projecting into said retainer recess in spaced parallel relation to said nut-seat, said projecting end portions being disposed in diametrically opposed relation to one another across said bolt-hole axis and overlying portions of said flange in confining relation thereto so as to retain said nut substantially in contact with said seat, said nut body projecting radially of said journal cavity axis between said projecting retainer pin end portions, with the latter being disposed in blocking relation to opposite sides of said nut body in relation to lateral shifting movement of the nut upon said seat, whereby to limit such lateral shifting movement.

5. A barrel nut as defined in claim 3, wherein said nut flange is rectangular, having respective squared ends loosely fitted between said retainer lips, and wherein said retainer pins are positioned in retaining relation to diagonally opposite corners of said flange.

References Cited in the file of this patent
UNITED STATES PATENTS

| | | |
|---|---|---|
| 167,118 | Pritchett | Aug. 24, 1875 |
| 2,120,462 | Ferguson | June 14, 1938 |
| 2,414,372 | Hallock | July 23, 1946 |
| 2,825,379 | Becker | Mar. 4, 1958 |

FOREIGN PATENTS

| | | |
|---|---|---|
| 483,089 | Great Britain | Apr. 12, 1938 |